United States Patent

Francois et al.

[15] 3,638,979
[45] Feb. 1, 1972

[54] FORCE-TRANSMITTING SYSTEMS

[72] Inventors: Edgar Francois, Wayne, N.J.; Edwin C. Uhlig, deceased, late of South Bend, Ind.; Doris L. Uhlig, administratrix, New Haven, Conn.

[73] Assignee: Uniroyal, Inc., New York, N.Y.

[22] Filed: Nov. 19, 1969

[21] Appl. No.: 878,046

[52] U.S. Cl. ................................287/124, 279/2, 287/53
[51] Int. Cl. .............................................................F16d 1/06
[58] Field of Search ....................287/124, 114, 53, 2; 279/2

[56] References Cited

UNITED STATES PATENTS

| 291,282 | 1/1884 | Blue | 272/2 |
|---|---|---|---|
| 1,706,973 | 3/1929 | Zagorski | 287/114 X |
| 2,308,542 | 1/1943 | Raybould | 287/114 |
| 2,446,406 | 8/1948 | Byerle | 287/124 X |
| 2,816,769 | 12/1957 | Noble | 287/114 X |
| 3,069,762 | 12/1962 | Sonnier | 279/2 X |

*Primary Examiner*—David J. Williamowsky
*Assistant Examiner*—Andrew V. Kundrat
*Attorney*—Norbert P. Holler

[57] ABSTRACT

A force-transmitting system including a cylindrical fiber-reinforced resin tube to which stress is transferred simultaneously via both the outside and inside surfaces of the tube, is disclosed. The system utilizes a drivable fitting which includes an external rigid coupling sleeve and an internal radially expansible circumferential arrangement of elongated wedge elements, defining between the former and the latter an annular cylindrical space in which one end region of the tube wall can be received and radially clamped. Distribution of stress transfer over the entire expanse of the clamped portion of the tube is provided for by means of a pair of substantially coextensive, circumferentially continuous, uniform thickness layers of elastomeric material bonded to the outside and inside tube surfaces, respectively. An expansible metal liner sleeve is bonded to the inner surface of the inner elastomer layer to prevent the latter from being extruded between the wedge elements, and the external surfaces of the latter may be roughened for positive gripping engagement with the inner surface of the liner sleeve.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

15 Claims, 9 Drawing Figures

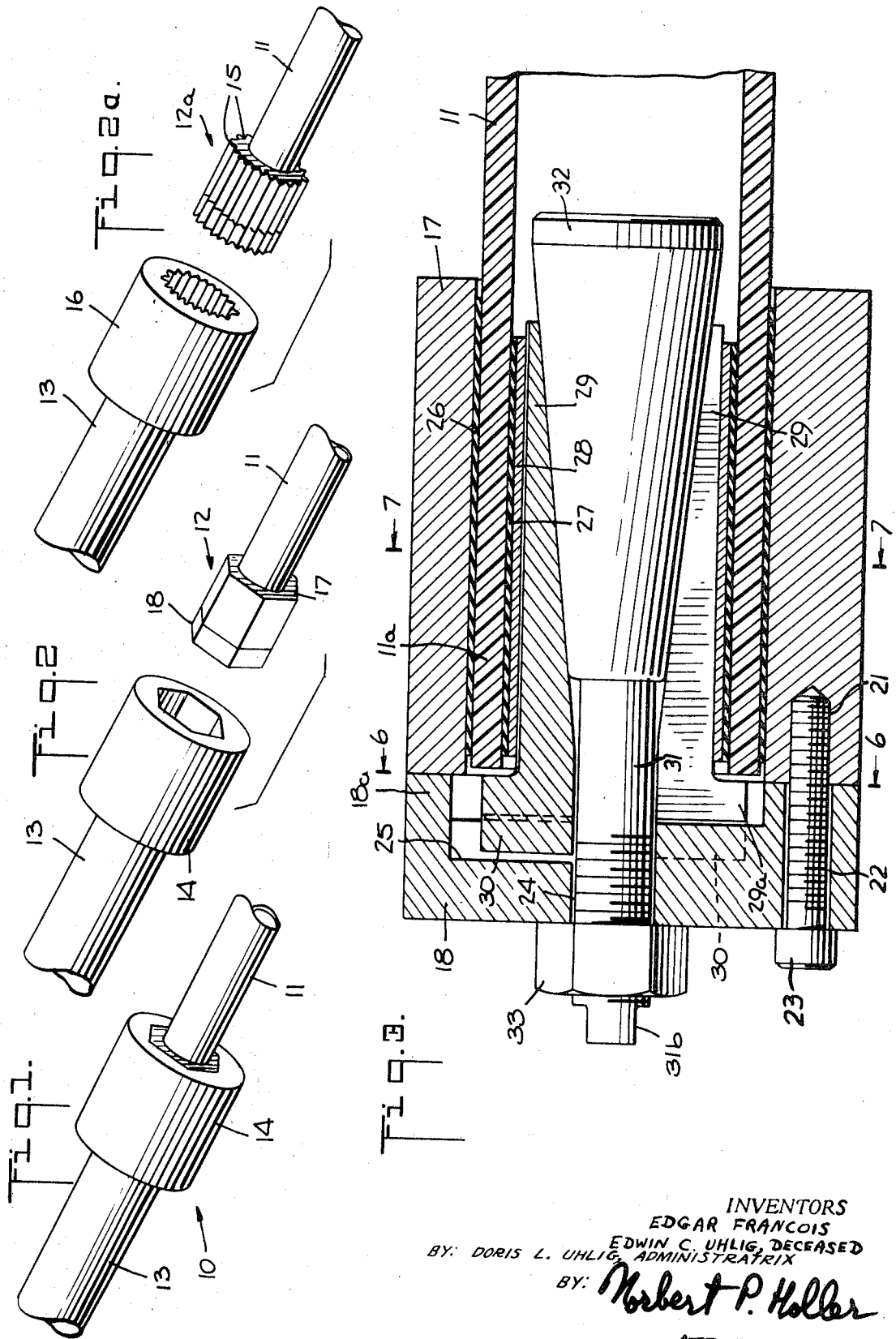

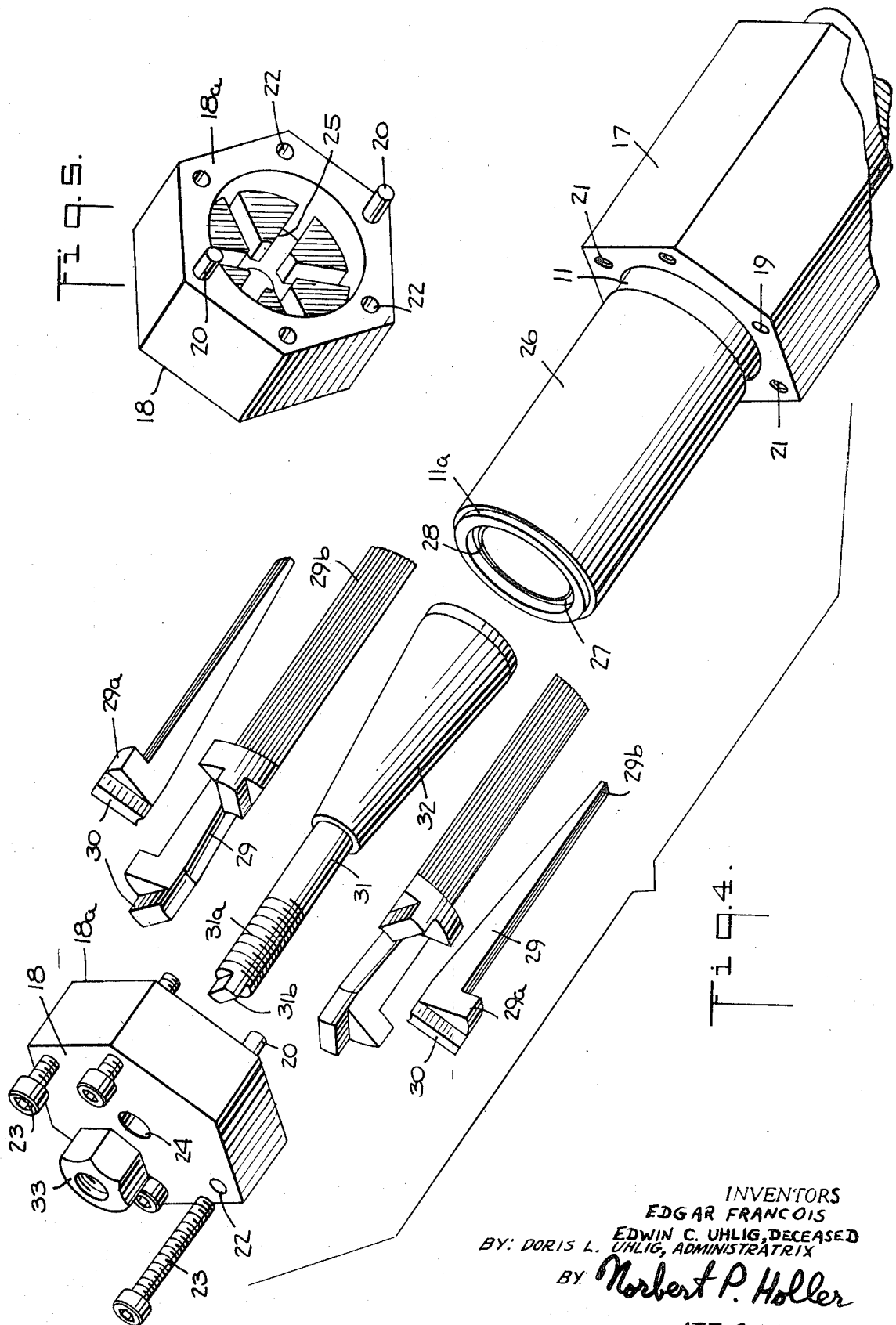

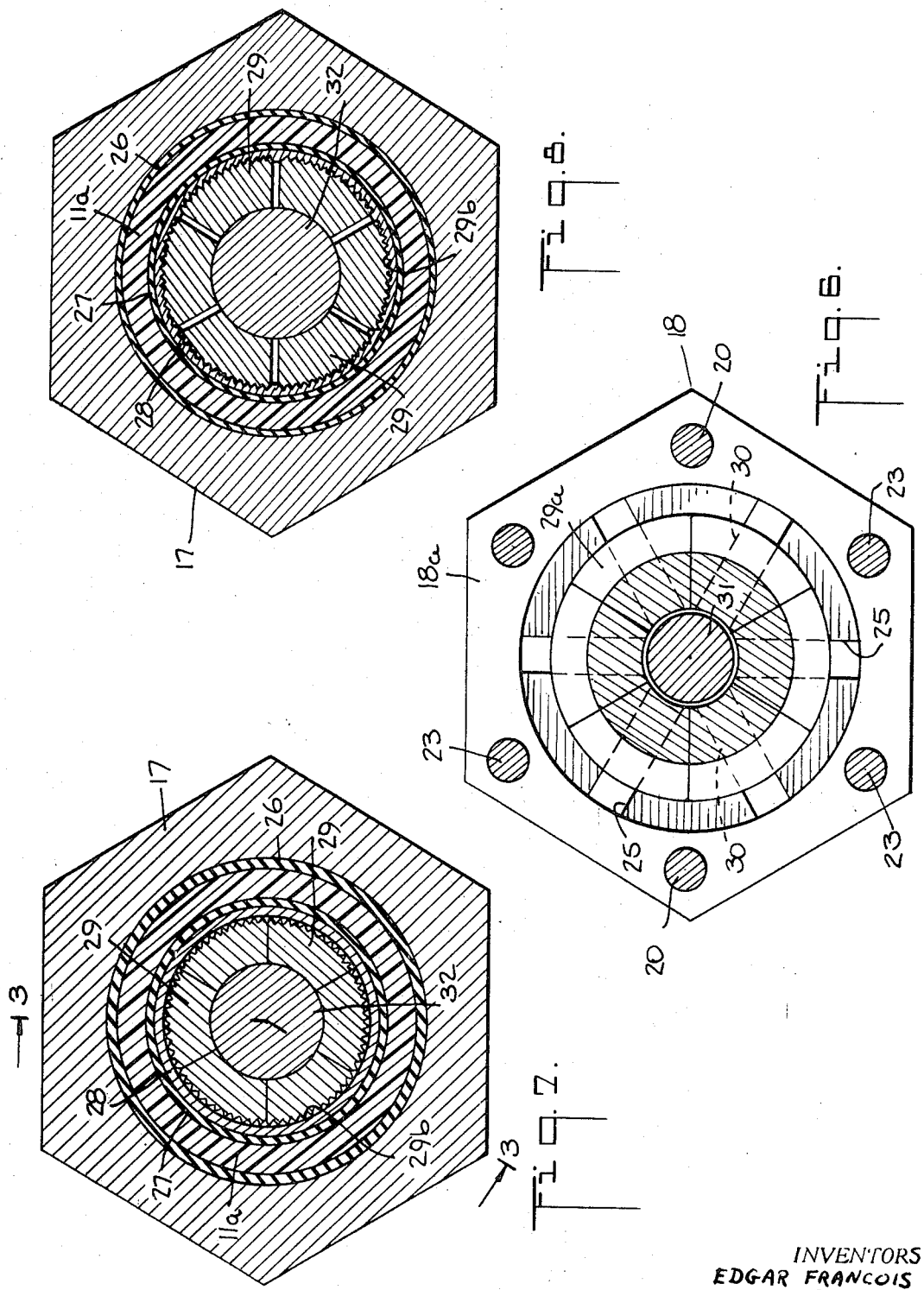

FORCE-TRANSMITTING SYSTEMS

This invention relates to force-transmitting systems utilizing elongated cylindrical tubes of fiber-reinforced resin. As used herein, the term "fiber-reinforced" is intended to designate both filament-wound and fiber-filled as well as fabric-reinforced resin structures.

Although the use of metallic bars, rods and tubes as force-transmitting members is well known, the use of such members made of fiber-reinforced resin may be highly desirable in any number of applications, for example, if reducing the weight of the force-transmitting member without adversely affecting its strength is an important consideration. Especially in the case of reinforced resin tubes, however, problems have been encountered in effecting a positive connection of the driving member to such a tube, and in preventing failure of the tube in the region of the connection under the applied stresses. Also, a resin/fiber tube requires a distribution of the applied stresses over a much larger area of the tube surface than does a metal tube.

It is an object of the present invention, therefore, to provide a novel force-transmitting system utilizing a cylindrical fiber-reinforced resin tube as the force-transmitting member, wherein the aforesaid problems are effectively overcome.

It is also an object of the present invention to provide a novel type of tube-clamping device or fitting for use in such a force-transmitting system as the means for connecting the fiber-reinforced resin tube to the power source.

Generally speaking, the present invention provides a force-transmitting system characterized by the inclusion of a drivable fitting by which the force to be transmitted is transferred to the cylindrical fiber-reinforced resin tube simultaneously from both the outside and inside surfaces of the tube. The fitting, which is designed to be radially clamped to one end region of the tube over the entire expanse of said region, includes an external rigid metal coupling sleeve and an internal radially expansible circumferential arrangement of elongated wedge elements, thereby defining between the former and the latter an annular space to receive the tube end region. The wedge elements extend axially of the coupling sleeve and of a cup-shaped end cap which is secured to the latter at one end thereof and bridges the open end of the tube, and the wedge elements are independently keyed to the inner face of the end cap for a limited degree of radial sliding movement. A conical draw rod located interiorly of the arrangement of wedge elements and activatable exteriorly of the end cap serves to effect the outward displacement of the wedge elements required for the clamping action. Both the end cap and the coupling sleeve are externally hexagonal, splined or otherwise arranged to provide for a positive driving connection of a correspondingly constructed output member or force-applying means of a power source to the cap and the coupling sleeve. Distribution of stress transfer over the entire length of the clamping portion of the fitting is achieved by means of a pair of substantially coextensive, circumferentially continuous, uniform thickness layers of elastomeric material bonded to the outside and inside tube surfaces, respectively. An expansible metal liner sleeve, which advantageously is bonded to the inner surface of the inner elastomer layer, serves to prevent the latter from being extruded between the wedge elements, and the external surfaces of the latter are knurled, serrated or otherwise roughened for positive gripping engagement with the inner surface of the liner sleeve.

The foregoing and other objects, characteristics and advantages of the present invention will be more clearly understood from the following detailed description thereof when read in conjunction with the accompanying drawings, in which:

FIG. 1 is a fragmentary perspective view of a force-transmitting system of the type referred to and shows a drive member coupled to a fiber-reinforced resin tube by means of a force-transferring fitting according to one embodiment of the present invention;

FIG. 2 is an exploded fragmentary perspective view of the force-transmitting system shown in FIG. 1 and illustrates the exterior configuration of the fitting;

FIG. 2a is a view similar to FIG. 2 of a force-transmitting system having a somewhat modified exterior configuration of the fitting;

FIG. 3 is a fragmentary longitudinal section through the tube and fitting of the system shown in FIGS. 1 and 2, the view being taken along the line 3—3 in FIG. 7;

FIG. 4 is an exploded perspective elevational view of the structure shown in FIG. 3;

FIG. 5 is a different perspective view of the end cap of the fitting to show details of the interior construction thereof;

FIG. 6 is a sectional view taken along the line 6—6 in FIG. 3; and

FIGs. 7 and 8 are sectional views taken along the line 7—7 in FIG. 3 and illustrate different stages of operation of the fitting.

Although the present invention is of general utility insofar as the transmission of forces is concerned, for the sake of simplicity the following description will in the main concern itself with a torque transmission system designed for use in a variety of applications such as land vehicles, including tanks, trucks and automobiles, aircraft, various types of machinery, and the like, where the use of torsion bars is required.

Referring now to the drawings in greater detail, the torque-transmitting system 10 according to the basic principles of the present invention as shown in FIGS. 1 and 2 comprises a fiber-reinforced resin torsion tube 11 (for example, a filament-wound glass fiber and epoxy resin tube, with the reinforcement being omitted from the drawing for the sake of clarity) and a fitting 12 clamped, in a manner to be more fully described presently, to one end region 11a of the torsion tube 11, the fitting being shown to have an external hexagonal shape so as to provide for a positive driving connection of a drive member 13, e.g., a shaft or axle connected with the main power source (not shown), to the fitting by means of a correspondingly internally hexagonal socket-shaped extension 14 of the member 13. It will, of course, be understood that such connection may be effected by other and equivalent means, for example by the provision of a fitting 12a (FIG. 2a) having external splines 15 to coact with an internally splined socket 16 of the drive member, or by locking the socket portion of the drive member to the fitting, in a manner not explicitly illustrated, by means of bolts, pin and slot connections, etc. Other than in the interlocking feature, however, the fitting 12a (and likewise any other equivalent fitting) is identical to the fitting 12, and the following detailed description of the latter will apply as well to the former.

The fitting 12 comprises a rigid metal tubular coupling sleeve 17 and a cup-shaped end cap 18 (FIGS. 2 to 5) both of which are externally identically hexagonal, with the sleeve further having a cylindrical inner surface of a diameter slightly in excess of the outer diameter of the tube 11 (see FIG. 3). The sleeve 17 is provided in its end wall with a pair of diametrically opposed smooth holes 19 (FIG. 4) adapted to receive a pair of dowel pins 20 (FIGS. 4 and 5) secured in corresponding positions to the rim 18a of the end cap 18, and with four circumferentially spaced tapped holes 21. The end cap is provided with four circumferentially spaced bores 22 in its marginal or rim region to enable suitable bolts or screws 23 to be passed therethrough and threaded into the corresponding holes 21 to secure the end cap to the coupling sleeve. The end cap 18 is further provided in its transverse web with an axial through-bore 24 and at the interior surface of the web with a plurality of radial keyways 25.

In its operational setting (FIGS. 3, 7 and 8), the fitting 12 is mounted on the end region 11a of the torsion tube 11, with the end cap 18 bridging the open end of the tube, and with the coupling sleeve 17 being disposed in surrounding relation to a circumferentially continuous thin layer 26 of elastomeric material, e.g., a suitable polyurethane or cis-polybutadiene composition, which is cemented by an adhesive, e.g., a suitable epoxy resin composition, to the outer surface of the end region 11a of the torsion tube. A substantially coextensive circumferentially continuous thin layer 27 of preferably the same elastomeric material is similarly cemented to the inner surface of the torsion tube 11 in the said end region thereof. Both elastomer layers are of uniform thickness throughout their entire expanse and thus may be considered as cylindrical layers. An expansible thin metal liner sleeve 28, for example made of 0.010-inch-thick aluminum, is cemented to the inner surface of the layer 27 for a purpose which will be more fully explained presently.

Arranged within the end region 11a of the tube interiorly of the liner sleeve 28 is a radially expansible means for generating the clamping forces required to connect the tube 11 and fitting 12 to one another secure against slippage. In the illustrated embodiment of the invention, the expansible means is in the form of a longitudinal split tubular structure having a cylindrical outer surface and a conical inner surface and constituted by a circumferential arrangement of a plurality of elongated rigid metal wedge-shaped elements 29 of circularly arcuate cross section (see FIGS. 4, 6, 7 and 8) which decrease in thickness in the direction away from the end cap 18. At their thickest ends the wedge elements 29 have enlarged transverse shoulders or flanges 29a (FIG. 4) which together define a radially outwardly projecting end flange on the split tubular structure (see also FIG. 6) and from the end faces of which project respective radial keys 30 radially slidably received in the keyways 25 in the end cap. The wedge elements are preferably longitudinally knurled or otherwise roughened on their exterior surfaces of facing the metal liner sleeve, as shown at 29b (FIGS. 4, 7 and 8).

Coaxially interiorly of the set of wedge elements 29 is disposed a draw rod 31 (FIGS. 3 and 4) having a conical body section 32 which increases in thickness in the direction away from the end cap and is located in the conical space defined by the wedge elements. The draw rod 31 extends freely through the space defined by the thickest portions of the wedge elements, has a threaded end section 31a extending through the axial bore 24 in the end cap 18, and terminates in a flat-faced end projection 31b. A nut 33 is threaded onto the draw rod section 31a exteriorly of the end cap and bears against the latter.

In the use of the torque transmission system 10, the end region 11a of the torsion tube 11, together with the elastomer layers 26 and 27 and the liner sleeve 28 carried thereby, is initially telescoped into the annular space defined between the inner cylindrical surface of the coupling sleeve 17 and the outer cylindrical surface of the split tubular structure defined by the wedge elements 29. The various parts of the fitting at that time are in the positions thereof shown in FIG. 7. The conical section 32 of the draw rod is then pulled axially toward the end cap, for example, by rotating the nut 33 while clamping the extension 31b of the draw rod to hold the latter against rotation, to effect a slight radially outward displacement of the wedge elements toward the coupling sleeve, sufficient to bring the parts to the positions thereof shown (to a somewhat exaggerated extent) in FIG. 8. As a result, the tube wall is firmly clamped against the coupling sleeve via the elastomer layers 26 and 27. The principal function of the liner sleeve 28 thus is seen to be to prevent extrusion of the inner elastomer layer 27 between the wedges as the latter separate slightly. As the internal pressure is applied, of course, the teeth 29b on the wedge elements bite into the liner sleeve and thereby assist in the transfer of stress to the latter and the prevention of any slippage between the wedge elements and the liner sleeve.

The end of region 11a of the torsion tube having the fitting 12 clamped thereto and the socket end 14 of the drive member of power shaft 13 are then telescoped one into the other. Upon rotation of the drive member, therefore, torque will be transferred into the torsion tube simultaneously via both the outside and inside surfaces thereof, the line of action in the one case being from the socket 14 directly to the coupling sleeve 17 and thence via the outer elastomer layer 26 to the outside tube surface, and in the other case being independently thereof from the socket directly to the end of cap 18 and thence via the keyways 25, the keys 30, the wedge elements 29, the liner sleeve 28 and the inner elastomer layer 27 to the inside tube surface. No torque is transferred from the end cap to the coupling sleeve or vice versa, the pins 20 and bolts 23 serving only to secure the end cap and coupling sleeve to one another in proper alignment. The elastomer layers must, of course, be of a thickness adequate to compensate for the differential strains between the metal parts of the fitting and the filamentary reinforcement of the resin torsion tube resulting from the differences in the elongation properties of the respective materials, and also to assure a distribution of the stress transfer over the entire expanse of the clamped end region of the torsion tube. We have found a thickness of 0.006 inch for the elastomer layers to be satisfactory for a 1-inch-diameter filament-wound glass fiber and epoxy resin tube. For larger tubes, the layer thickness would have to be increased in proportion to the increase in diameter.

The present invention thus makes it possible to use straight-surfaced fiber-reinforced resin tubes of uniform wall thickness as torque-transmitting members, by virtue of the fact that the presence of the inner and outer elastomer layers on the tube surfaces in conjunction with the transfer of stress into the tube simultaneously via both surfaces serves to prevent stress concentrations and eliminates the need for increasing the tube end wall thickness so as to compensate for such stress concentrations, which not only prolongs the useful service life of the tube but increases its torque capability as well.

As will be readily apparent, the principles of the present invention are applicable to the transmission of other types of forces than torque, e.g., bending, pushing and pulling forces. In any such system, however, some slight modifications of certain structural elements of the clamp fitting may be required. Merely by way of example, for the transmission of such pushing, pulling or bending forces, nonlongitudinal (e.g., circumferential, spiral, crisscross, etc.) knurling or serrations would have to be provided on the wedge elements, and the fitting and socket would have to be bolted or screwed or otherwise axially nonslidably locked together, rather than being interlocked by means of a "hex" or splined connection. Under certain conditions, furthermore, for example, where relatively high pulling forces are to be transmitted, it may also be found advisable to modify the key and keyway construction, as by a dovetail arrangement or the like, so as to enable it better to support such forces.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

Having thus described the invention, what is claimed and desired to be protected by Letters Patent is:

1. A force-transmitting system, comprising a cylindrical, open-ended, fiber-reinforced resin tube having first and second substantially coextensive, circumferentially continuous layers of elastomeric material bonded to respective mutually overlying regions of the inner and outer tube surfaces, each of said layers being of uniform thickness throughout its expanse, and a force-transferring fitting having external rigid sleeve means and concentric internal radially expansible means defining an annular space about the latter in which the portion of said tube carrying said elastomer layers is received, said tube being clamped to said fitting by activation of said expansible means to press said tube outwardly via said elastomer layers against said sleeve means.

2. A force-transmitting system, comprising a cylindrical, open-ended, fiber-reinforced resin tube, first and second substantially coextensive, circumferentially continuous layers of elastomeric material bonded to respective mutually overlying regions of the inner and outer surfaces of said tube, each of said layers being of uniform thickness throughout its expanse, a rigid metal tubular coupling sleeve with a cylindrical inner surface disposed in surrounding relation to the outer surface of said second elastomer layer, radially expansible means located interiorly of said tube and said first elastomer layer for applying outwardly directed pressure to said tube in the region of said elastomer layers and clamping said tube to said coupling sleeve via said elastomer layers, means for selectively activating said expansible means, and means for enabling establishment of a joint driving connection between force-applying means and both said expansible means and said coupling sleeve, whereby upon expansion of said expansible means, force may be transferred by said coupling sleeve and said second elastomer layer to the outer surface of said tube, and simultaneously but independently thereof by said expansible means and said first elastomer layer to the inner surface of said tube, said elastomer layers ensuring a distribution of stress transfer to said tube over the entire expanse of said overlying regions of said tube surfaces.

3. A force-transmitting system according to claim 2, said means for enabling the driving connection to be established comprising a rigid metal end cap secured to one end of said coupling sleeve and bridging the proximate open end of said tube, means interlocking said end cap and said expansible means against displacement relative to one another in the direction of the force to be transmitted, and means on said coupling sleeve and said end cap adapted to coact with corresponding means on said force-applying means for interlocking the coupling sleeve/end cap entity and said force-applying means against displacement relative to one another in the direction of the force to be transmitted.

4. A force-transmitting system, comprising a cylindrical, open-ended, fiber-reinforced resin tube, first and second substantially coextensive, circumferentially continuous layers of elastomeric material bonded to respective overlying regions of the inner and outer surfaces of said tube, each of said layers being of uniform thickness throughout its expanse, an expansible tubular metal liner sleeve located within said tube and bonded over its entire outer surface to the inner surface of said first elastomer layer, a rigid metal tubular coupling sleeve with a cylindrical inner surface disposed in surrounding relation to the outer surface of said second elastomer layer, a cup-shaped end cap secured at the rim thereof to said coupling sleeve at the end of the latter overlying the proximate open end of said tube, said end cap and said coupling sleeve being provided with means adapted to coact with corresponding means on the output end of a drive member for interlocking the coupling sleeve/end cap entity and said drive member against displacement relative to one another in the direction of the force to be transmitted, said end cap being provided with an axial through-bore and with a plurality of radial keyways in its interior surface facing said open end of said tube, a plurality of elongated wedge-shaped elements of circularly arcuate cross section extending axially along and in side-by-side configuration interiorly of said tube and said liner sleeve, said elements decreasing in thickness in the direction away from said end cap and conjointly defining a split tubular structure having a cylindrical exterior configuration and a conical internal space which increases in diameter in the direction away from said end cap, said elements being roughened on their surfaces facing said liner sleeve, each of said elements at its thickest portion just outside said open end of said tube having a key structure radially slidably received in a respective one of said keyways in said end cap, a draw rod having a conical body section arranged coaxially within the confines of said conical space and having its widest portion juxtaposed to the thinnest portions of said elements, said draw rod including an externally threaded end section extending through the space within the confines of the keyed thickest portions of said elements and through said bore in said end cap, and a nut threaded on said end section of said draw rod at the exterior of said end cap and bearing against the latter to enable said conical body section of said draw rod, upon rotation of said nut relative to said draw rod in the appropriate direction, to be pulled toward said end cap for displacing said elements radially outwardly to an extent sufficient to clamp the overlying region of said tube tightly against said coupling sleeve via said liner sleeve and said elastomer layers, whereby upon such outward displacement of said elements, force may be transmitted by said coupling sleeve and said second elastomer layer to the outer surface of said tube, and simultaneously but independently thereof by said end cap, said keys, said elements, said liner sleeve and said first elastomer layer to the inner surface of said tube, said elastomer layers ensuring a distribution of stress transfer to said tube over the entire axial length of said overlying regions of said tube surfaces.

5. A force-transmitting system according to claim 4, said interlocking means comprising an external hexagonal configuration of both said coupling sleeve and said end cap.

6. A force-transmitting system according to claim 4, said interlocking means comprising an external splined configuration of both said coupling sleeve and said end cap.

7. A force-transmitting system according to claim 4, said interlocking means comprising an external threaded configuration of both said coupling sleeve and said end cap.

8. A clamp fitting for a force-transmitting system wherein a cylindrical, open-ended tube is used as the force-transmitting member, said fitting comprising a rigid metal tubular coupling sleeve with a cylindrical inner surface, a cup-shaped end cap secured at the rim thereof to one end of said coupling sleeve, said end cap being provided with an axial through-bore and with a plurality of radial keyways in its interior surface facing the interior of said coupling sleeve, a plurality of elongated wedge-shaped elements of circularly arcuate cross section extending axially along and in side-by-side configuration interiorly of said coupling sleeve, said elements decreasing in thickness in the direction away from said end cap and conjointly defining a split tubular structure having a cylindrical exterior configuration and a conical internal space which increases in diameter in the direction away from said end cap, said coupling sleeve and said tubular structure defining therebetween an annular space adapted to receive the open end region of said tube, each of said elements at its thickest portion having a key structure radially slidably received in a respective one of said keyways for interlocking said end cap and said elements against displacement relative to one another in the direction of the force to be transmitted, a draw rod having a conical body section arranged coaxially within the confines of said conical space and having its widest portion juxtaposed to the thinnest portions of said elements, said draw rod including an externally threaded end section extending through the space within the confines of the keyed thickest portions of said elements and through said bore in said end cap, and a nut threaded on said end section of said draw rod at the exterior of said end cap and bearing against the latter to enable said conical body section of said draw rod, upon rotation of said nut relative to said draw rod in the appropriate direction, to be pulled toward said end cap for displacing said elements radially outwardly toward said coupling sleeve, whereby upon application of said force to said coupling sleeve and said end cap, stress can be transferred simultaneously but independently into the inside and outside surfaces of a tube clamped between said coupling sleeve and said elements.

9. A clamp fitting according to claim 8, both said coupling sleeve and said end cap having an external hexagonal configuration adapted to coact with a corresponding internal configuration of a force-applying means.

10. A clamp fitting according to claim 8, both said coupling sleeve and said end cap having an external splined configuration adapted to coact with a corresponding internal configuration of a force-applying means.

11. A clamp fitting according to claim 8, both said coupling sleeve and said end cap having an external threaded configuration adapted to coact with a corresponding internal configuration of a force-applying means.

12. A clamp fitting for a force-transmitting system wherein a cylindrical, open-ended, fiber-reinforced resin tube is used as the force-transmitting member, said fitting comprising a rigid metal tubular coupling sleeve with a cylindrical inner surface, a cup-shaped end cap secured at the rim thereof to one end of said coupling sleeve, said end cap being provided with an axial through-bore and with a plurality of radial keyways in its interior surface facing the interior of said coupling sleeve, a plurality of elongated wedge-shaped elements of circularly arcuate cross section extending axially along and in side-by-side configuration interiorly of said coupling sleeve, said elements decreasing in thickness in the direction away from said end cap and conjointly defining a split tubular structure having a cylindrical exterior configuration and a conical internal space which increases in diameter in the direction away from said end cap, said coupling sleeve and said tubular structure defining therebetween an annular space adapted to receive the open end region of said tube, a pair of substantially coextensive, circumferentially continuous, cylindrical layers of elastomeric material and different diameters adapted to be bonded to respective overlying regions of the inner and outer surfaces of said tube, each of said layers being of uniform thickness throughout its expanse, an expansible tubular metal liner sleeve adapted to be bonded over its entire outer surface to the inner surface of the inner one of said elastomer layers and to be located in surrounding relation to said tubular structure, said elements being roughened on their surfaces facing said liner sleeve, each of said elements at its thickest portion having a key structure slidably received in a respective one of said keyways in said end cap for interlocking said end cap and said elements against displacement relative to one another in the direction of the force to be transmitted, a draw rod having a conical body section arranged coaxially within the confines of said conical space and having its widest portion juxtaposed to the thinnest portions of said elements, said draw rod including an externally threaded end section extending through the space within the confines of the keyed thickest portions of said elements and through said bore in said end cap, and a nut threaded on said end section of said draw rod at the exterior of said end cap and bearing against the latter to enable said conical body section of said draw rod, upon rotation of said nut relative to said draw rod in the appropriate direction, to be pulled toward said end cap for displacing said elements radially outwardly toward said coupling sleeve, whereby upon application of said force to said coupling sleeve and said end cap, stress can be transferred simultaneously but independently into the inside and outside surfaces of a tube clamped between said coupling sleeve and said elements, said elastomer layers being effective to distribute the stress transfer over the entire expanse of the clamped region of said tube.

13. A clamp fitting according to claim 12, both said coupling sleeve and said end cap having an external hexagonal configuration adapted to coact with a corresponding internal configuration of a force-applying means.

14. A clamp fitting according to claim 12, both said coupling sleeve and said end cap having an external splined configuration adapted to coact with a corresponding internal configuration of force-applying means.

15. A clamp fitting according to claim 12, both said coupling sleeve and said end cap having an external threaded configuration adapted to coact with a corresponding internal configuration of a force-applying means.

* * * * *